(12) United States Patent
Wright

(10) Patent No.: US 6,412,396 B1
(45) Date of Patent: Jul. 2, 2002

(54) POPCORN POPPING APPARATUS

(76) Inventor: Sammie Wright, P.O. Box 638, Gravette, AR (US) 72736

( * ) Notice: Subject to any disclaimer, the term of this patent is extended or adjusted under 35 U.S.C. 154(b) by 0 days.

(21) Appl. No.: 09/797,612

(22) Filed: Mar. 5, 2001

(51) Int. Cl.[7] .............................. A23L 1/18
(52) U.S. Cl. .................. 99/323.9; 99/323.7; 99/323.5
(58) Field of Search ................... 99/323.9, 323.11, 99/323.5, 323.8, 323.7

(56) References Cited

U.S. PATENT DOCUMENTS

| | | | |
|---|---|---|---|
| 1,021,322 A | * 3/1912 | McCoig | 99/323.9 |
| 1,206,693 A | * 11/1916 | Gillitt | 99/323.9 |
| 2,922,355 A | 1/1960 | Green | 99/323.11 |
| 3,209,672 A | * 10/1965 | Baunach | 99/323.9 X |
| 4,152,974 A | 5/1979 | Tienor | 99/323.8 |
| D260,649 S | 9/1981 | Wondergem | D15/8 |
| 4,702,158 A | 10/1987 | Ishihara | 99/323.5 |
| 5,069,923 A | * 12/1991 | Hubbard et al. | 99/323.9 X |
| 5,263,405 A | * 11/1993 | Simon | 99/323.7 |
| 5,501,139 A | 3/1996 | Lee | 99/323.9 |
| 6,187,353 B1 | * 2/2001 | Wyman et al. | 99/323.5 X |

* cited by examiner

Primary Examiner—Reginald L. Alexander

(57) ABSTRACT

A popcorn popping apparatus for increasing the use of popcorn as a packaging material by popping popcorn in large volumes. The popcorn popping apparatus includes a housing having top, side, and bottom walls; and also includes a corn feeder assembly being attached to the housing; and further includes a popcorn dispensing assembly being attached to the housing; and also includes a corn popper assembly being disposed in the housing for popping corn.

8 Claims, 2 Drawing Sheets

POPCORN POPPING APPARATUS

BACKGROUND OF THE INVENTION

1. Field of the Invention

The present invention relates to a packaging popcorn popper and more particularly pertains to a new popcorn popping apparatus for increasing the use of popcorn as a packaging material by popping popcorn in large volumes.

2. Description of the Prior Art

The use of a packaging popcorn popper is known in the prior art. More specifically, a packaging popcorn popper heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,263,405; U.S. Pat. No. 5,501,139; U.S. Pat. No. 4,702,158; U.S. Pat. No. 4,152,974; U.S. Pat. No. Des. 260,649; and U.S. Pat. No. 2,922,355.

While these devices fulfill their respective, particular objectives and requirements, the aforementioned patents do not disclose a new popcorn popping apparatus. The inventive device includes a housing having top, side, and bottom walls; and also includes a corn feeder assembly being attached to the housing; and further includes a popcorn dispensing assembly being attached to the housing; and also includes a corn popper assembly being disposed in the housing for popping corn.

In these respects, the popcorn popping apparatus according to the present invention substantially departs from the conventional concepts and designs of the prior art, and in so doing provides an apparatus primarily developed for the purpose of increasing the use of popcorn as a packaging material by popping popcorn in large volumes.

SUMMARY OF THE INVENTION

In view of the foregoing disadvantages inherent in the known types of packaging popcorn popper now present in the prior art, the present invention provides a new popcorn popping apparatus construction wherein the same can be utilized for increasing the use of popcorn as a packaging material by popping popcorn in large volumes.

The general purpose of the present invention, which will be described subsequently in greater detail, is to provide a new popcorn popping apparatus which has many of the advantages of the packaging popcorn popper mentioned heretofore and many novel features that result in a new popcorn popping apparatus which is not anticipated, rendered obvious, suggested, or even implied by any of the prior art packaging popcorn popper, either alone or in any combination thereof.

To attain this, the present invention generally comprises a housing having top, side, and bottom walls; and also includes a corn feeder assembly being attached to the housing; and further includes a popcorn dispensing assembly being attached to the housing; and also includes a corn popper assembly being disposed in the housing for popping corn.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new popcorn popping apparatus which has many of the advantages of the packaging popcorn popper mentioned heretofore and many novel features that result in a new popcorn popping apparatus which is not anticipated, rendered obvious, suggested, or even implied by any of the prior art packaging popcorn popper, either alone or in any combination thereof.

It is another object of the present invention to provide a new popcorn popping apparatus which may be easily and efficiently manufactured and marketed.

It is a further object of the present invention to provide a new popcorn popping apparatus which is of a durable and reliable construction.

An even further object of the present invention is to provide a new popcorn popping apparatus which is susceptible of a low cost of manufacture with regard to both materials and labor, and which accordingly is then susceptible of low prices of sale to the consuming public, thereby making such popcorn popping apparatus economically available to the buying public.

Still yet another object of the present invention is to provide a new popcorn popping apparatus which provides in the apparatuses and methods of the prior art some of the advantages thereof, while simultaneously overcoming some of the disadvantages normally associated therewith.

Still another object of the present invention is to provide a new popcorn popping apparatus for increasing the use of popcorn as a packaging material by popping popcorn in large volumes.

Yet another object of the present invention is to provide a new popcorn popping apparatus which includes a housing having top, side. and bottom walls; and also includes a corn feeder assembly being attached to the housing; and further includes a popcorn dispensing assembly being attached to the housing; and also includes a corn popper assembly being disposed in the housing for popping corn.

Still yet another object of the present invention is to provide a new popcorn popping apparatus that is easy and convenient to use.

Even still another object of the present invention is to provide a new popcorn popping apparatus that effectively allows popcorn to be used as a filler for packaging purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
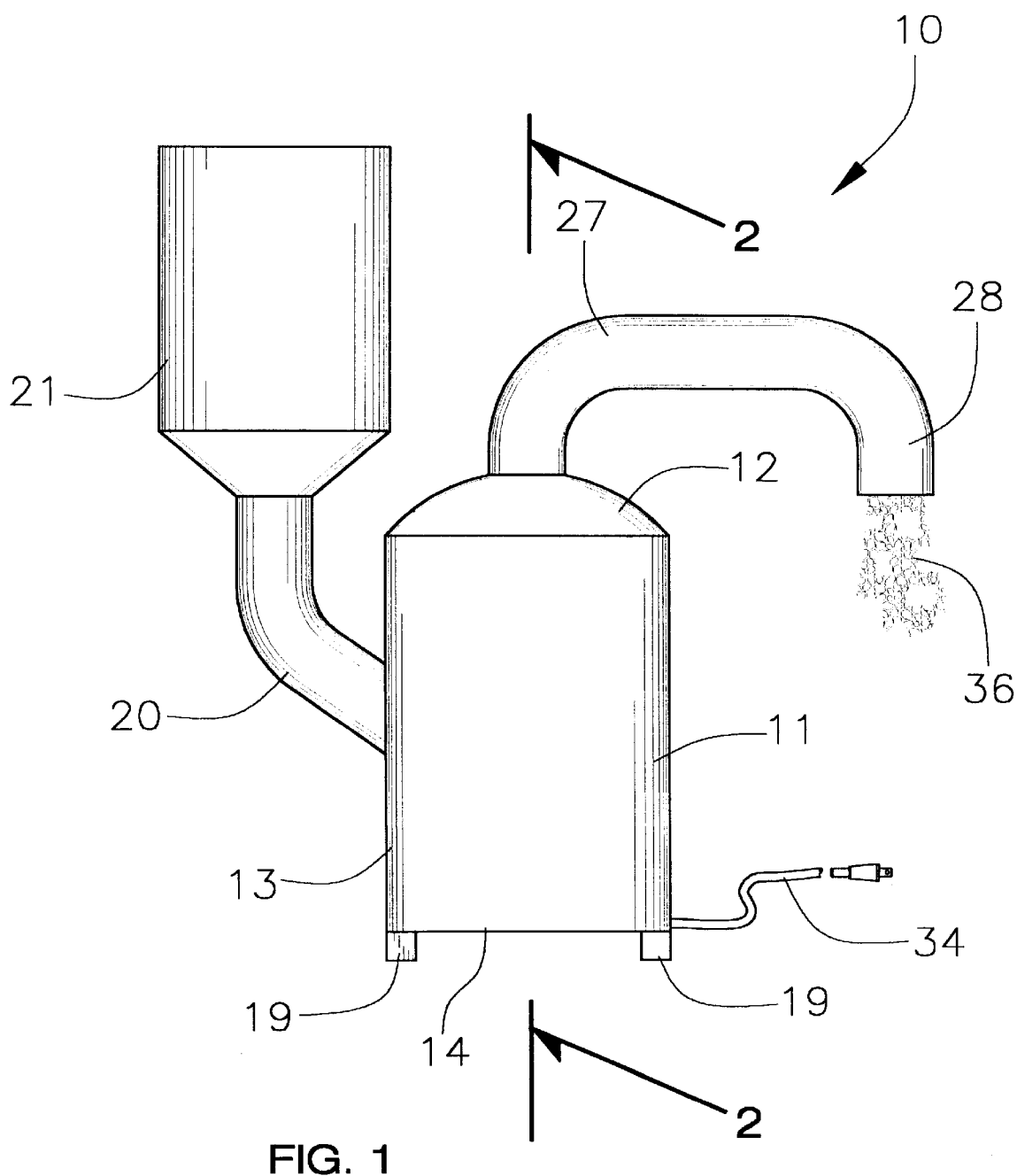
FIG. 1 is a side elevational view of a new popcorn popping apparatus according to the present invention.
Figure 2:
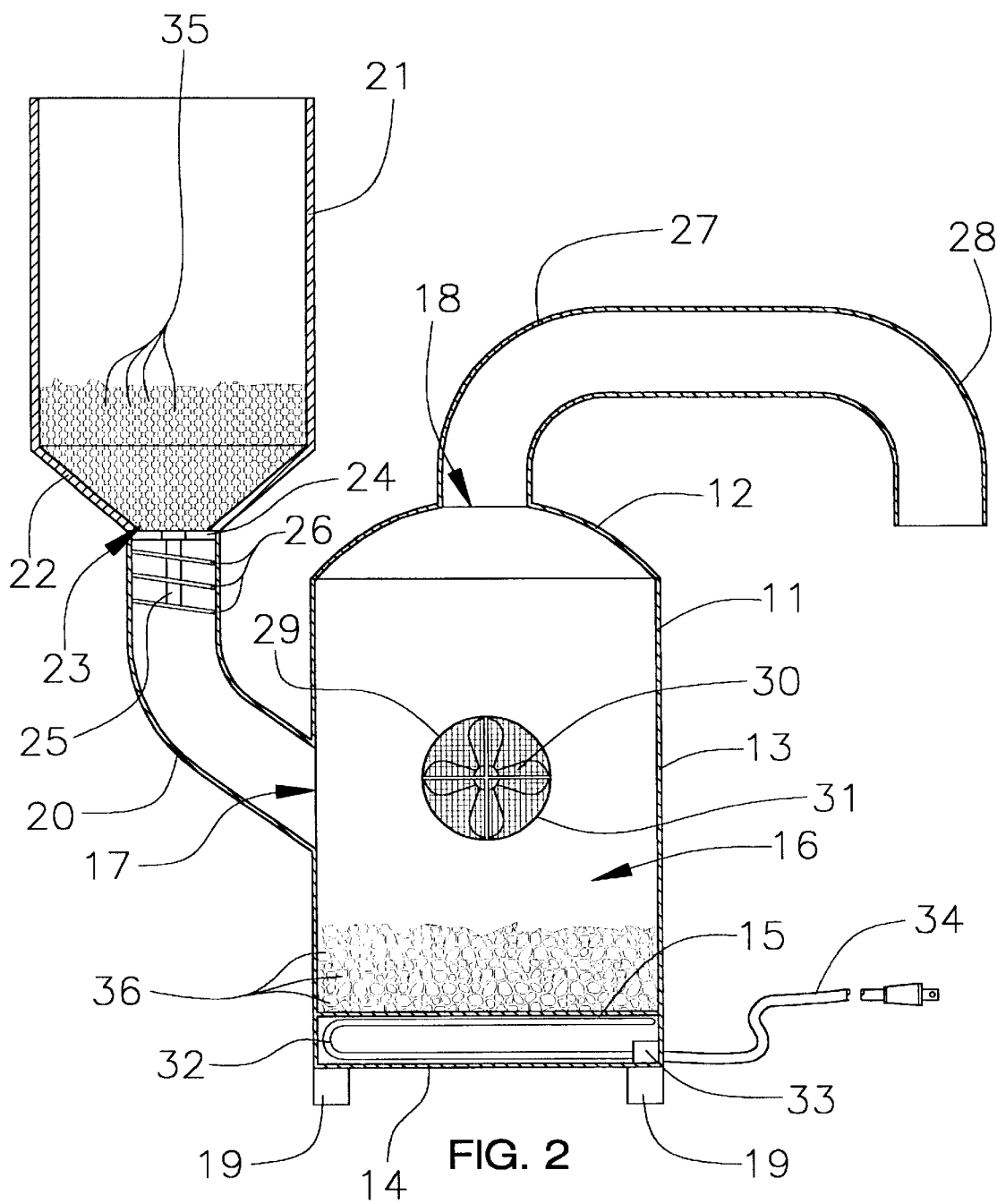
FIG. 2 is a cross-sectional view of the present invention.

With reference now to the drawings, and in particular to FIGS. 1 through 2 thereof, a new popcorn popping apparatus embodying the principles and concepts of the present invention and generally designated by the reference numeral 10 will be described.

As best illustrated in FIGS. 1 through 2, the popcorn popping apparatus 10 generally comprises a housing 11 having top, side, and bottom walls 12,13,14. The housing 11 further includes an intermediate wall 15 being conventionally disposed in the housing 11 and being spaced above the bottom wall 14, and also includes inlet and outlet ports 17.18 being disposed through the side and top walls 12,13, and further includes a popping chamber 16 being disposed therein. The housing 11 is conventionally mounted upon support members 19 with the inlet and outlet ports 17.18 extending into the popping chamber 16.

A corn feeder assembly is attached to the housing 11. The corn feeder assembly includes a feeding chute 20 being conventionally connected to the inlet port 17 of the housing 11, and also includes a hopper 21 being conventionally mounted at an end of the feeding chute 20 and being adapted to hold corn 35 therein and having an opening 23 through a bottom wall 22 thereof for dispensing the corn 35 into the feeding chute 20. The corn feeder assembly further includes an auger 24 having a shaft 25 being rotatably and conventionally disposed in the opening 23 of the hopper 21 and extending into the feeding chute 20 and being conventionally driven, and also having flighting 26 being spacedly and conventionally attached about the shaft 25 for dispensing the corn 35 from the hopper 21 through the feeding chute 20. The feeding chute 20 is angled upwardly relative to the bottom wall 14 of the housing 11.

A popcorn dispensing assembly is conventionally attached to the housing 11. The popcorn dispensing assembly includes an outlet chute 27 being conventionally attached to the outlet port 18 of the housing 11 and having outer end portion 28 which is angled downwardly relative to the bottom wall 14 of the housing 11, and also includes a blower unit 29 being conventionally disposed in the popping chamber 16 of the housing 11 for blowing popcorn 36 through the outlet port 18 and through the outlet chute 27. The blower unit 29 includes a fan member 30 being enclosed with a screen 31.

A corn popper assembly is conventionally disposed in the housing 11 for popping the corn 35. The corn popper assembly includes heating elements 32 being conventionally disposed in the housing 11 between the intermediate wall 15 and the bottom wall 14, and further includes a thermostat member 33 being conventionally attached to the heating elements 32, and also includes a power cord 34 being conventionally connected to the thermostat member 33 for energizing the heating elements 32.

In use. the user fills the hopper 21 with popping corn 35 and energizes the heating elements 32 and turns on the blower unit 29, and then allows the popping corn 35 to be dispensed from the hopper 21 into the popping chamber 16 where the heating elements 32 make the popping corn 35 pop into popcorn 36; whereupon, the blower unit 29 urges the popcorn 36 from the popping chamber 16 through the outlet chute 27 and into bags which can be placed over the outer end portion 28 of the outlet chute 27.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A popcorn popping apparatus comprising:
   a housing having top, side, and bottom walls;
   a corn feeder assembly being attached to said housing;
   a popcorn dispensing assembly being attached to said housing; and
   a corn popper assembly being disposed in said housing for popping corn;
   wherein said housing further includes an intermediate wall being disposed in said housing and being spaced above said bottom wall, inlet and outlet ports being disposed through said side and top walls, and a popping chamber being disposed therein, said inlet and outlet ports being in communication with said popping chamber;
   wherein said corn popper assembly includes heating elements being disposed in said housing between said intermediate wall and said bottom wall.

2. A popcorn popping apparatus as described in claim 1, wherein said corn popper assembly includes a thermostat member being attached to said heating elements and a power cord being connected to said thermostat member for energizing said heating elements.

3. A popcorn popping apparatus as described in claim 1, wherein said corn feeder assembly includes a feeding chute being connected to said inlet port of said housing, and also includes a hopper being mounted at an end of said feeding chute and being adapted to hold corn therein and having an opening through a bottom wall thereof for dispensing corn into said feeding chute.

4. A pop corn popping apparatus as described in claim 3, wherein said corn feeder assembly further includes an auger having a shaft being rotatably disposed in said opening of said hopper and extending into said feeding chute, and also having flighting being spacedly attached about said shaft for dispensing the corn from said hopper through said feeding chute, said feeding chute being angled upwardly relative to said bottom wall of said housing.

5. A popcorn popping apparatus as described in claim 1, wherein said popcorn dispensing assembly includes an outlet chute being attached to said outlet port of said housing and having outer end portion which is angled downwardly relative to said bottom wall of said housing, and also includes a blower unit being disposed in said popping chamber of said housing for blowing popcorn through said outlet port and through said outlet chute.

6. A popcorn popping apparatus as described in claim 5, wherein said blower unit includes a fan member being enclosed with a screen.

7. A popcorn popping apparatus comprising:
   a housing having top, side, and bottom walls;
   a corn feeder assembly being attached to said housing;
   a popcorn dispensing assembly being attached to said housing; and
   a corn popper assembly being disposed in said housing for popping corn;
   wherein said housing further includes an intermediate wall being disposed in said housing and being spaced above said bottom wall, and also includes inlet and outlet ports being disposed through said side and top walls, and further includes a popping chamber being disposed therein, said housing being mounted upon support members, said inlet and outlet ports extending into said popping chamber;
   wherein said corn popper assembly includes heating elements being disposed in said housing between said intermediate wall and said bottom wall, and further includes a thermostat member being attached to said heating elements, and also includes a power cord being connected to said thermostat member for energizing said heating elements.

8. A popcorn popping apparatus comprising:
   a housing having top, side, and bottom walls, said housing further including an intermediate wall being disposed in said housing and being spaced above said bottom wall, and also including inlet and outlet ports being disposed through said side and top walls, and further including a popping chamber being disposed therein, said housing being mounted upon support members said inlet and outlet ports extending into said popping chamber;
   a corn feeder assembly being attached to said housing, said corn feeder assembly including a feeding chute being connected to said inlet port of said housing, and also including a hopper being mounted at an end of said feeding chute and being adapted to hold corn therein and having an opening through a bottom wall thereof for dispensing corn into said feeding chute, said corn feeder assembly further including an auger having a shaft being rotatably disposed in said opening of said hopper and extending into said feeding chute, and also having flighting being spacedly attached about said shaft for dispensing the corn from said hopper through said feeding chute, said feeding chute being angled upwardly relative to said bottom wall of said housing;
   a popcorn dispensing assembly being attached to said housing, said popcorn dispensing assembly including an outlet chute being attached to said outlet port of said housing and having outer end portion which is angled downwardly relative to said bottom wall of said housing, and also including a blower unit being disposed in said popping chamber of said housing for blowing popcorn through said outlet port and through said outlet chute, said blower unit including a fan member being enclosed with a screen; and
   a corn popper assembly being disposed in said housing for popping corn, said corn popper assembly including heating elements being disposed in said housing between said intermediate wall and said bottom wall, and further including a thermostat member being attached to said heating elements, and also including a power cord being connected to said thermostat member for energizing said heating elements.

\* \* \* \* \*